(12) United States Patent
Modes et al.

(10) Patent No.: US 12,307,891 B2
(45) Date of Patent: May 20, 2025

(54) METHOD AND SYSTEM FOR AUTOMATICALLY DETERMINING A DISPLAY STATUS OF A TRAFFIC SIGNAL INSTALLATION

(71) Applicant: Bayerische Motoren Werke Aktiengesellschaft, Munich (DE)

(72) Inventors: Felix Modes, Erding (DE); Oliver Wick, Hohenkammer (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 163 days.

(21) Appl. No.: 17/921,419

(22) PCT Filed: Apr. 26, 2021

(86) PCT No.: PCT/EP2021/060872
§ 371 (c)(1),
(2) Date: Oct. 26, 2022

(87) PCT Pub. No.: WO2021/219571
PCT Pub. Date: Nov. 4, 2021

(65) Prior Publication Data
US 2023/0162604 A1    May 25, 2023

(30) Foreign Application Priority Data
Apr. 30, 2020   (DE) .................... 10 2020 111 861.9

(51) Int. Cl.
*G08G 1/0967* (2006.01)
*G06V 20/58* (2022.01)
(52) U.S. Cl.
CPC ..... *G08G 1/096725* (2013.01); *G06V 20/584* (2022.01); *G08G 1/096783* (2013.01)

(58) Field of Classification Search
CPC ................................................ G08G 1/096725
See application file for complete search history.

(56) References Cited

U.S. PATENT DOCUMENTS 5,633,629 A    5/1997    Hochstein
8,692,996 B2 *  4/2014   Davis ..................... G01J 3/505
                                                   356/402

(Continued)

FOREIGN PATENT DOCUMENTS

CN    102176287 A    9/2011
CN    106205152 A    12/2016

(Continued)

OTHER PUBLICATIONS

International Search Report (PCT/ISA/210) issued in PCT Application No. PCT/EP2021/060872 dated Jul. 7, 2021 with English translation (five (5) pages).

(Continued)

*Primary Examiner* — Michael A Berns
(74) *Attorney, Agent, or Firm* — Crowell & Moring LLP

(57) ABSTRACT

A method automatically determines a display status of a traffic signal installation by: detecting a traffic signal installation in vehicle surroundings of a vehicle, including a signal transmitter structure of the traffic signal installation; detecting an electromagnetic signal issuing from the traffic signal installation; detecting intensity variations in the detected signal over time; and determining a display status of the traffic signal installation. The determining takes place on the basis of the detected intensity variations and an original location of the detected signal relative to the signal transmitter structure.

14 Claims, 2 Drawing Sheets

(56) References Cited

U.S. PATENT DOCUMENTS

| | | | |
|---|---|---|---|
| 8,831,849 B2* | 9/2014 | Joshi | G05D 1/0276 701/1 |
| 9,892,332 B1* | 2/2018 | Wendel | G06V 30/194 |
| 10,012,997 B2* | 7/2018 | Ben Shalom | B60W 10/20 |
| 10,032,085 B2* | 7/2018 | Raghu | G06V 20/582 |
| 10,614,325 B1* | 4/2020 | Ginsberg | G08G 1/096791 |
| 10,699,142 B2* | 6/2020 | Wisniowski | G08G 1/09623 |
| 11,328,519 B2* | 5/2022 | Hsiao | G06V 20/584 |
| 11,485,382 B2* | 11/2022 | Adiprasito | G08G 1/096725 |
| 2018/0281802 A1 | 10/2018 | Oyama | |
| 2018/0308352 A1 | 10/2018 | Li et al. | |
| 2020/0081450 A1 | 3/2020 | Creusot et al. | |
| 2020/0348417 A1 | 11/2020 | Kunberger | |
| 2021/0001879 A1 | 1/2021 | Adiprasito et al. | |
| 2023/0162604 A1* | 5/2023 | Modes | H04W 4/44 701/117 |

FOREIGN PATENT DOCUMENTS

| | | |
|---|---|---|
| CN | 106251664 A | 12/2016 |
| CN | 108706009 A | 10/2018 |
| DE | 10 2005 061 786 A1 | 6/2007 |
| DE | 10 2009 051 040 A1 | 6/2010 |
| DE | 10 2018 201 374 B3 | 3/2019 |
| DE | 10 2018 203 353 A1 | 9/2019 |
| EP | 3 370 215 A1 | 9/2018 |

OTHER PUBLICATIONS

German-language Written Opinion (PCT/ISA/237) issued in PCT Application No. PCT/EP2021/060872 dated Jul. 7, 2021 (two (2) pages).

German-language Search Report issued in German Application No. 10 2020 111 861.9 dated Jan. 14, 2021 with partial English translation (12 pages).

Pang G. et al., "A Novel Use Of LEDs to Transmit Audio and Digital Signals", IEEE Industry Applications Magazine, Jan. 1, 2002, pp. 21-28, vol. 8, No. 1, XP011093295, (two (2) pages).

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).

"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).

Chinese-language Office Action issued in Chinese Application No. 202180030486.1 dated Apr. 8, 2023 with English translation (15 pages).

* cited by examiner

METHOD AND SYSTEM FOR AUTOMATICALLY DETERMINING A DISPLAY STATUS OF A TRAFFIC SIGNAL INSTALLATION

BACKGROUND AND SUMMARY

The invention relates to methods and a system for automatically determining a display status of a traffic signal installation, for example, a traffic light installation. Such a method or system can be used in particular in a vehicle which is configured for automated driving up to driverless driving.

The term "automated driving" can be understood in the scope of the document as driving having automated longitudinal or lateral control or autonomous driving having automated longitudinal and lateral control. The term "automated driving" comprises automated driving with an arbitrary degree of automation.

Exemplary degrees of automation are assisted, partially automated, highly automated, or fully automated driving. These degrees of automation were defined by the Bundesanstalt für Straßenwesen [German Federal Highway Research Institute] (BASt) (see BASt publication "Forschung kompakt [compact research]", edition November 2012).

In assisted driving, the driver continuously executes the longitudinal or lateral control, while the system takes over the respective other function in certain limits.

In partially automated driving (TAF), the system takes over the longitudinal and lateral control for a certain period of time and/or in specific situations, wherein the driver has to continuously monitor the system as in assisted driving.

In highly automated driving (HAF), the system takes over the longitudinal and lateral control for a certain period of time without the driver having to continuously monitor the system; however, the driver has to be capable of taking over the vehicle control in a certain time.

In fully automated driving (VAF), the system can automatically manage the driving in all situations for a specific application; a driver is no longer necessary for this application. The above-mentioned four degrees of automation according to the definition of the BASt correspond to the SAE levels 1 to 4 of the norm SAE J3016 (SAE—Society of Automotive Engineering). For example, highly automated driving (HAF) according to the BASt corresponds to level 3 of the norm SAE J3016. Furthermore, the SAE level 5 is also provided as the highest degree of automation in SAE J3016, which is not included in the definition of the BASt. The SAE level 5 corresponds to driverless driving, in which the system can automatically manage all situations like a human driver during the entire journey; a driver is generally no longer required.

Various solutions for automatic traffic signal recognition, for example, for determining a display status of a traffic light installation, are known from the prior art. The items of information thus obtained can be used, for example, for automated driving functions of a vehicle, i.e., automated driving functions can be controlled in dependence on such items of information.

The known solutions for automatic traffic signal recognition are predominantly based on optical recognition systems which recognize artificial light sources, e.g., traffic lights, headlights, brake lights, turn signals, etc. on the basis of their colors and shapes and possibly in the context of the respective situation.

It is disadvantageous here that the recognition performance is often limited by specific environmental conditions, e.g., backlight, fog, rain, etc. A limitation can also result, for example, in that a camera-image converter used (camera imager) does not support a specific color channel which is relevant for the recognition.

It is the object of the invention to provide a method and a system for automatically determining a display status of a traffic signal installation, which at least partially overcomes the disadvantages of solutions known in the prior art.

The object is achieved by the features of the independent claims. Advantageous embodiments are described in the dependent claims.

It is to be noted that additional features of a claim dependent on an independent claim, without the features of the independent claim or in combination with only a subset of the features of the independent claim, can form a separate invention independent of the combination of all features of the independent claim, which can be made the subject matter of an independent claim, a divisional application, or a subsequent application. This applies in the same manner to technical teachings described in the description, which can form an invention independent of the features of the independent claims.

For example, a general information transmission mentioned hereinafter, by a traffic signal installation, which is designed to deliberately code items of information (for example, of the type mentioned in the claims) by means of time-dependent intensity variations of an electromagnetic signal, can in principle also be implemented in its entirety independently of the method steps indicated in the independent method claim.

A first aspect of the invention relates to a method for automatically determining (in the sense of recognizing) a display status of a traffic signal installation.

The traffic signal installation can be, for example, a light signal installation (LSI; often also referred to colloquially as a "traffic light installation"). In this constellation, the display status to be determined can relate, for example, to a traffic light status of the type "on", "off", "red", "green", "yellow", "flashing", "arrow to the right", "arrow to the left", or the like.

One step of the method is recognizing a traffic signal installation in vehicle surroundings of a vehicle.

The vehicle can be configured here, for example, for at least partially automated driving. In particular, the vehicle can be configured to be controlled in an at least partially automated manner in dependence on the automatically determined display status of the traffic signal installation.

The (automatic) recognition of a traffic signal installation means that a traffic signal installation is recognized as such, i.e., that an object in the vehicle surroundings is identified in the meaning of a classification as a traffic signal installation.

For example, the recognition of the traffic signal installation can take place at least partially on the basis of map data which indicate a position of the traffic signal installation. In other words, for example, in the scope of the recognition of the traffic signal installation, a comparison or a plausibility check can take place of data acquired by means of surroundings sensors to previously known cartographic data, which are provided, for example, in a geo-database.

The step of recognizing the traffic signal installation also includes recognizing a signal generator structure of the traffic signal installation.

This means that a previously known signal generator structure is recognized, for example, a typical traffic light structure having two or three light signal generators, which are arranged in a specific sequence vertically one over the other or horizontally adjacent to one another. Regional or local aspects can also play a role in this recognition, for example, in the manner that depending on a country in which the vehicle is located, a comparison using sensorially acquired data to specific "expected" signal generator structures (for example stored in corresponding databases) takes place.

A further step is acquiring an electromagnetic signal originating from the traffic signal installation.

The electromagnetic signal can be, for example, a light signal in the optical wavelength range, e.g., a red, green, or yellow light signal in a traffic light installation. Alternatively or additionally, the electromagnetic signal can also comprise frequencies in a nonvisible range.

The acquisition of the electromagnetic signal can be carried out by means of suitable sensors, for example, an optical camera and/or one or more lidar sensors. For example, current camera systems or novel technologies can be used for this purpose, for example, event-based cameras which can recognize different flickering patterns by frame rates in the 1 ms range.

In a further step, intensity variations over time of the acquired signal are automatically recognized. The intensity variations can be, for example, flickering of a light source, for example, as a result of power variations in the case of an AC voltage supply of an incandescent lamp or a pulse width modulation (PWM) in an LED. Alternatively or additionally, the intensity variations can be induced, for example, by luminance changes due to generally undesired variations of the grid voltage in a power grid which powers the traffic signal installation. This phenomenon is often also referred to as "flickering".

It is furthermore in the scope of the invention that the intensity variations can, according to some embodiments, comprise deliberately generated intensity variations. Items of information to be transmitted can be coded in the signal by corresponding deliberately generated intensity variations, for example.

In a further included embodiment variant of the method according to the invention, a step can furthermore accordingly be provided, in which a signal having specific intensity variations is deliberately generated by means of a traffic signal installation.

With respect to further properties of the intensity variations of the signal, it is provided in one preferred embodiment that these take place at one or more frequencies in a frequency range that cannot be resolved by the human eye. In particular, one or more frequencies of the intensity variations of the signal can be greater than a so-called flicker fusion frequency. The frequency (frequencies) of the intensity variations can be, for example, at least 22 Hz, preferably at least 90 Hz.

A further step of the method according to the invention is the determination of a display status of the traffic signal installation. The determination takes place here in dependence on the recognized intensity variations and on an origin location of the acquired signal with respect to the signal generator structure (i.e., in relation to the signal generator structure).

The determination of the display status is to be understood in general as an automatic recognition of a specific display status (e.g., "red" or "green" in a traffic light installation).

According to some embodiments, the determination of the display status can be carried out, for example, in dependence on the presence of such intensity variations at a specific location within the recognized signal generator structure. In other words, for example, it can be automatically concluded from the acquisition of intensity variations in an upper (lower/middle) region of a recognized traffic light structure that the traffic light status is "red" ("green"/"yellow").

In addition to such a rather qualitative dependence on the acquired intensity variations, for example, it can also be provided that the determination is carried out in dependence on properties of the acquired intensity variations per se. This can relate, for example, to the evaluation of quantitative properties such as a frequency of the intensity variations, wherein, for example, a specific frequency can be associated with a specific display status. Thus, for example, in a traffic light installation, the red signal light can deliberately be provided with an intensity variation over time at a specific frequency (or in a specific frequency range) and the green signal light can deliberately be provided with an intensity variation over time at a specific different frequency (or in a specific different frequency range). A particularly reliable display status recognition can accordingly take place not only on the basis of an association of the origin location of the acquired signal (having the intensity variations) relative to the recognized signal generator structure, but rather additionally on the basis of a direct association of the frequency of the acquired intensity variations with a specific display status.

The intensity variations can be associated not only with a respective display status on the basis of a frequency or a frequency range here, but rather in accordance with some embodiments, in principle an arbitrarily complex logical coding of the signal can be used as the basis for such a display status-related association via correspondingly designed intensity variations over time.

The invention includes the finding that on the basis of intensity variations over time of electromagnetic signals which originate from a traffic signal installation, profitable items of information can be generated which can be used in particular in the scope of automated driving functions. Thus, for example, the recognition performance of an automatic traffic light status recognition can be increased in that intensity variations of a respective light unit (for example, flickering in a traffic light installation having LEDs) are recognized. An association of an acquired light signal with a respective traffic light status can take place on the basis of an acquired origin location of the light signal relative to a recognized signal generator structure (e.g., "red", "green", "yellow" in vertical arrangement).

The potential of the invention for an improvement of the recognition performance can be illustrated with the following exemplary scenario: In a map which is available in an automated vehicle, the accurate position of a traffic light installation is noted. A typical camera detects the traffic light installation in the vehicle surroundings and it is recognized as the traffic light installation recorded in the map. In addition, the signal generator structure of the traffic light installation and possibly the current traffic light color is recognized by means of the camera. Upon recognition of the traffic light color, a plausibility check of the traffic light status is performed via detected flickering of a currently lighted traffic light LED, in order to initiate the correct reaction of the automated vehicle thereupon. In this case, the traffic light status is determined for the plausibility check in dependence on the recognized flickering and on an origin location of the acquired light signal with respect to the signal generator structure. In other words, the traffic light color can be concluded via the position of the detected flickering (for example, "green" if the flickering is detected at the lowermost position of a vertical signal generator structure).

In this way, the traffic light status can also be detected, for example, if the traffic light color cannot be detected directly due to low-lying sun, but the signal generator structure of the traffic light installation (i.e., for example, the arrangement of "red", "green", "yellow") can be detected.

In accordance with the exemplary scenario explained above, the determination according to the invention of the display status can be carried out, for example, as a plausibility check of another recognition method (for example, directly on the basis of the color and/or the contour of a light source of the signal).

The method can thus comprise, according to one refinement, for example, the following steps in addition: recognizing a color of the acquired signal; determining a display status of the traffic signal installation in dependence on the recognized color; and comparing (i.e., checking the plausibility of) the display status determined in dependence on the color with the display status determined in dependence on the intensity variations and the origin location of the signal.

Alternatively or additionally, the method can comprise: recognizing a contour of a light source of the acquired signal (for example, "circle" or "arrow to the right"); determining a display status of the traffic signal installation in dependence on the recognized contour; and comparing (i.e., checking the plausibility of) the display status determined in dependence on the contour with the display status determined in dependence on the intensity variations and the origin location of the signal.

As already mentioned above, the intensity variations over time of the signal can also have been deliberately generated in some embodiments, specifically in such a way that they code specific items of information. In this way, the traffic signal installation can be used, for example, for information transfer and can provide a variety of further items of information to the vehicle beyond its own display status.

In accordance therewith, the method can comprise according to one refinement logical decoding of the intensity variations over time and thus determining of at least one element from the following list: verbal communication contents, for example, of the type as are typically transmitted in radio or as speech data in the scope of mobile wireless; items of weather information (for example, weather warnings); items of information on the traffic situation (for example, traffic warnings); items of information which are exchanged in the scope of a system for cooperative driving (for example, items of trajectory information for maneuvering coordination).

According to one embodiment variant, the items of information determined by the logical decoding are then conveyed to a vehicle occupant by means of a display and/or playback device. The display or playback can take place, for example, optically and/or acoustically.

In a further embodiment variant, it is provided that the vehicle is controlled in an at least partially automated manner in dependence on the items of information determined by the logical decoding. This can relate to cases, for example, in which items of information which are exchanged in the scope of a system for cooperative driving are transmitted in the described manner from the traffic signal installation to the vehicle.

A second aspect of the invention relates to a system for automatically determining a display status of a traffic signal installation. The system can be provided, for example, for arrangement in or on a vehicle, in particular an automated vehicle.

The system comprises one or more sensors and one or more evaluation units, wherein the system is configured to execute each of the following steps by means of at least one of the sensors and/or by means of at least one of the evaluation units: recognizing a traffic signal installation in vehicle surroundings of a vehicle, including a signal generator structure of the traffic signal installation; acquiring an electromagnetic signal originating from the traffic signal installation; recognizing intensity variations over time of the acquired signal; determining a display status of the traffic signal installation, wherein the determination is carried out in dependence on the recognized intensity variations and on an origin location of the acquired signal with respect to the signal generator structure.

For example, the evaluation unit(s) can be configured to execute a corresponding algorithm which assists the above method steps. This can in principle be a deterministic or a nondeterministic algorithm (for example based on a neural network).

According to one embodiment, the sensor or sensors comprise a (for example optical) camera and/or a lidar sensor.

Furthermore, according to one embodiment, the sensor or the sensors can be designed to acquire intensity variations of the acquired signal at one or more frequencies in a frequency range that cannot be resolved by the human eye. These can be, for example, frequencies above a flicker fusion frequency. For example, the frequencies can be at least 22 Hz, preferably at least 90 Hz.

For example, a camera having a frame rate in the 1 ms range can be used as a sensor to detect such comparatively high frequency intensity variations.

The above statements on the method according to the invention according to the first aspect of the invention also apply correspondingly to the system according to the invention according to the second aspect of the invention. Advantageous exemplary embodiments of the system according to the invention not explicitly described at this point and in the claims correspond to the advantageous exemplary embodiments of the method according to the invention described in the description or the claims and vice versa.

For example, in accordance with an above-described method variant, a further included system can also comprise the traffic signal installation, which is configured to deliberately generate an electromagnetic signal having specific intensity variations (for example, specific frequencies or also more complex codings).

The invention is described hereinafter on the basis of exemplary embodiments with the aid of the appended drawings.

DETAILED DESCRIPTION OF THE DRAWINGS

Figure 1:
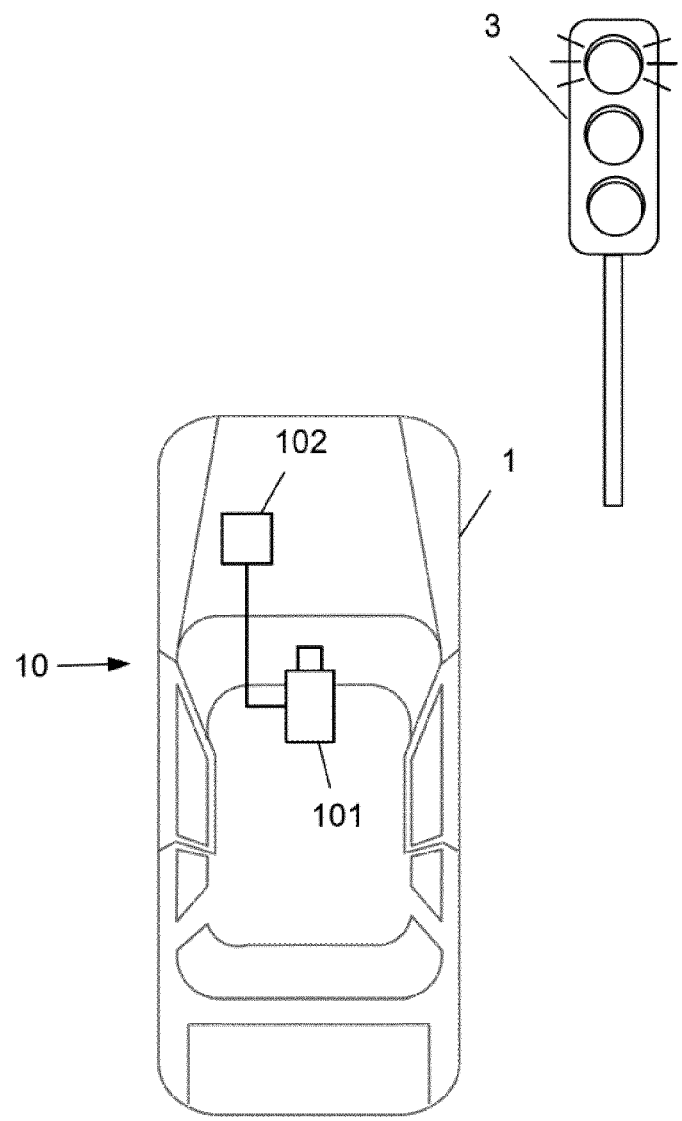
FIG. 1 schematically shows an example of a system for automatically determining a display status of a traffic signal installation according to one or more embodiments.

FIG. 1 schematically shows an exemplary scenario having an automated vehicle 1 which approaches a traffic signal installation in the form of a traffic light installation 3.

The vehicle 1 is equipped with a system 10 for automatically determining a display status of a traffic signal installation 3. The system 10 comprises a camera 101 and an evaluation unit 102 connected to the camera 101.

The functionality of the system 10 according to FIG. 1 is explained hereinafter in the scope of the exemplary scenario, wherein reference is also made at the same time to general method steps 21, 22, 23, 24 schematically illustrated in FIG. 2.

In a map, which is available to the automated vehicle 1, the accurate position of the traffic light installation 3 is noted. The camera 101 detects the traffic light installation 3 in the vehicle surroundings of the vehicle 1. The traffic light installation 3 is recognized as the traffic light installation 3 recorded in the map by means of the evaluation unit 102.

In addition, by means of the camera 101 and the evaluation unit, the signal generator structure of the traffic light installation 3 (in the present case a typical vertical arrangement of circular signal lights in the sequence: top red, middle yellow, bottom green) is recognized.

Figure 2:
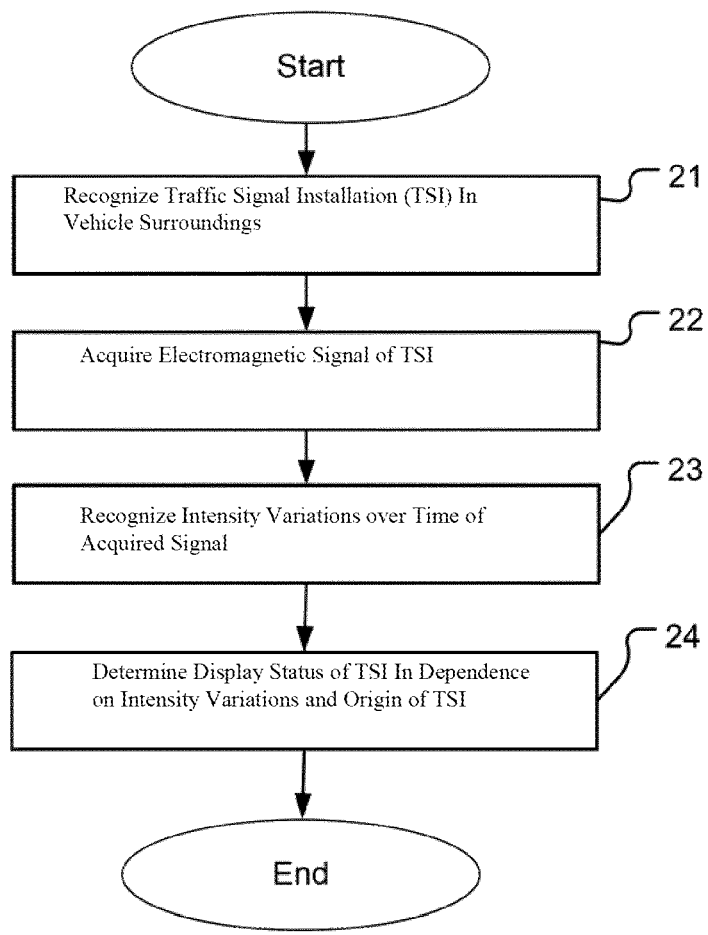
FIG. 2 is a schematic flow chart of a method for automatically determining a display status of a traffic signal installation according to one or more embodiments.

With respect to the schematic method sequence according to FIG. 2, this corresponds to step 21: recognizing 21 a traffic signal installation 3 in vehicle surroundings of a vehicle 1, including a signal generator structure of the traffic signal installation 3.

The camera 101 moreover also acquires the light signal originating from the traffic light installation 3, possibly including its color (red), corresponding to step 22 according to FIG. 2: acquiring 22 an electromagnetic signal originating from the traffic signal installation 3.

In addition, the camera 101 (possibly in cooperation with the evaluation unit 102) recognizes flickering of the light signal originating from the traffic light installation 3, which originates, for example, from a PWM of the signal light, which can be designed in the form of LEDs. The flickering can be so high frequency here, for example, that it is not resolved by the human eye.

This corresponds to step 23 in FIG. 2: recognizing intensity variations over time of the acquired signal.

By means of the evaluation unit 102, the traffic light status is then determined in dependence on the recognized flickering and on an origin location of the acquired light signal with respect to the signal generator structure. In other words, the current traffic light status is inferred via the position of the detected flickering (in the present case: "red", since the flickering is detected at the topmost position of the recognized vertical traffic light structure).

This corresponds to step 24 in FIG. 2: determining a display status of the traffic signal installation 3, wherein the determination 23 takes place in dependence on the recognized intensity variations and on an origin location of the acquired signal with respect to the signal generator structure.

In the described manner, the traffic light status can also be detected, for example, if the traffic light color cannot be detected directly due to low-lying sun, but the signal generator structure of the traffic light installation 3 can be detected.

If the traffic light color is additionally also recognized directly, a plausibility check of the traffic light status can be performed via the detected flickering of the currently lighted traffic light LED, in order to increase the recognition reliability.

Accordingly, the method can optionally comprise the following steps: determining a display status of the traffic signal installation 3 in dependence on the recognized color; and comparing (i.e., checking the plausibility of) the display status determined in dependence on the color to the display status determined in dependence on the intensity variations and the origin location of the signal.

A correct reaction of the automated vehicle 1 can then be initiated automatically in dependence on the determined traffic light status (for example stopping before the red light).

Beyond the described application scenario, such an automatic detection and evaluation of acquired intensity variations of electromagnetic signals in the road traffic can also be made usable in principle in other ways. It is thus conceivable, for example, that a flickering of LED vehicle headlights is recognized at night. A high beam assistant can thereupon switch to low beams, for example.

Furthermore, an assistance of image processing by a detection of intensity variations of electromagnetic signals (for example flickering) is generally conceivable, for example, for the following applications:

vehicle classification by detecting flickering of the taillights of a vehicle;

assisting the image processing in the detection of turnoff processes (detecting a set turn signal);

assisting the image processing in the detection of neon signs.

The invention claimed is:

1. A computer implemented method for automatically determining a display status of a traffic signal installation, the method comprising the steps of:
   recognizing, with one or more sensors of a vehicle, a traffic signal installation in vehicle surroundings of the vehicle, including a signal generator structure of the traffic signal installation;
   acquiring, with the one or more sensors of the vehicle, an electromagnetic signal originating from the traffic signal installation;
   recognizing, with one or more evaluation units of the vehicle, intensity variations over time of the acquired signal, wherein the intensity variations of the acquired signal take place at one or more frequencies in a frequency range that cannot be resolved by a human eye;
   determining, with the one or more evaluation units of the vehicle, a display status of the traffic signal installation, wherein the determination is carried out in dependence on the recognized intensity variations at the one or more frequencies in the frequency range that cannot be resolved by the human eye and on an origin location of the acquired signal with respect to a position of the origin location on the signal generator structure.

2. The computer implemented method according to claim 1, wherein
   the recognition of the traffic signal installation is carried out at least partially based on map data which indicate a position of the traffic signal installation.

3. The computer implemented method according to claim 1, further comprising:
   recognizing a color of the acquired signal;
   determining a display status of the traffic signal installation in dependence on the recognized color;
   comparing the display status determined in dependence on the color to the display status determined in dependence on the intensity variations and the origin location of the acquired signal.

4. The computer implemented method according to claim 1, wherein
   the vehicle is controlled in an at least partially automated manner in dependence on the determined display status.

5. The computer implemented method according to claim 1, wherein the method further comprises:

logically decoding the intensity variations over time and thus determining at least one element from a group comprising:
verbal communication content;
items of weather information;
items of information on a traffic situation;
items of information which are exchanged in a system for cooperative driving.

6. The computer implemented method according to claim 5, wherein
the items of information determined by the logical decoding are conveyed to a vehicle occupant via a display and/or playback device.

7. The computer implemented method according to claim 5, wherein
the vehicle is controlled in an at least partially automated manner in dependence on the items of information determined by the logical decoding.

8. The computer-implemented method of claim 1, wherein the one or more sensors comprise an event-based camera.

9. The computer implemented method of claim 1, wherein the position of the origin location on the signal generator structure is one of an upper region, a middle region, or a lower region of the signal generator structure of the traffic signal installation.

10. A system for automatically determining a display status of a traffic signal installation, comprising:
one or more sensors; and
one or more evaluation units,
wherein the system is configured to execute, via at least one of the one or more sensors or the one or more evaluation units, the acts of:
recognizing a traffic signal installation in vehicle surroundings of a vehicle, including a signal generator structure of the traffic signal installation;
acquiring an electromagnetic signal originating from the traffic signal installation;
recognizing intensity variations over time of the acquired signal, wherein the intensity variations of the acquired signal take place at one or more frequencies in a frequency range that cannot be resolved by a human eye;
determining a display status of the traffic signal installation, wherein the determination is carried out in dependence on the recognized intensity variations at the one or more frequencies in the frequency range that cannot be resolved by the human eye and on an origin location of the acquired signal with respect to a position of the origin location on the signal generator structure.

11. The system according to claim 10, wherein:
the one or more sensors comprise a camera and/or a lidar sensor.

12. The system according to claim 10, wherein:
the one or more sensors are designed to acquire intensity variations of the acquired signal at one or more frequencies in a frequency range that cannot be resolved by a human eye.

13. The system of claim 10, wherein the one or more sensors comprise an event-based camera.

14. The system of claim 10, wherein the position of the origin location on the signal generator structure is one of an upper region, a middle region, or a lower region of the signal generator structure of the traffic signal installation.

* * * * *